United States Patent [19]
Tajima et al.

[11] Patent Number: 5,239,549
[45] Date of Patent: Aug. 24, 1993

[54] COMPOSITE SLAB LASER MEDIUM AND A LASER EMPLOYING THE COMPOSITE SLAB LASER MEDIUM

[75] Inventors: Hidemi Tajima, Nishitama; Mitsuhisa Moriyama, Kawasaki, both of Japan

[73] Assignee: Hoya Corporation, Tokyo, Japan

[21] Appl. No.: 766,400

[22] Filed: Sep. 27, 1991

[30] Foreign Application Priority Data

Sep. 27, 1990 [JP] Japan .................. 2-260665

[51] Int. Cl.$^5$ ............................... H01S 3/14
[52] U.S. Cl. ........................ 372/39; 372/66
[58] Field of Search ............ 372/66, 39, 41, 69, 372/70, 72

[56] References Cited

U.S. PATENT DOCUMENTS

| | | | |
|---|---|---|---|
| 4,881,233 | 11/1989 | von Arb et al. | 372/66 |
| 5,084,889 | 1/1992 | Tajima | 372/39 |

*Primary Examiner*—Leon Scott, Jr.
*Attorney, Agent, or Firm*—Oliff & Berridge

[57] ABSTRACT

A composite slab laser medium provided with a nondoped layer containing substantially no laser active materials and a first and second doped layers provided at both sides of the non-doped layer, respectively, in such a manner to hold the non-doped layer, each of which contains a laser active material. In this composite slab laser, a first surface of the first doped layer and a second surface of the second doped layer are in contact with the outside of the composite slab laser medium and are parallel with each other. Further, a laser oscillation or an optical amplification is performed by extracting a laser beam which travels in a zig-zag path undergoing total internal reflection at the first and second surfaces employed as alternate reflecting surfaces within the composite slab laser medium. Moreover, layers made of laser glass containing $Nd_2O_3$ of from 3 to 9% by weight is employed as the doped layers. Furthermore, a total of the thicknesses of the first and second doped layers is of from 0.6 to 8.0 mm. Additionally, the ratio of the total of the thicknesses of the first and second doped layers to the thickness of the whole composite slab laser medium is of from 0.075 to 0.40. Thereby, a composite slab laser medium, the gain of which is well balanced with the cross section of a laser beam, can be realized. Further, a laser provided with such a laser medium and a pump source for optical pumping of the laser medium can be provided. Thereby, a laser capable of emitting a laser beam with a high-beam-quality and high-peak-power can be realized.

24 Claims, 5 Drawing Sheets

FIG.5

| CASE | 1 | 2 | 3 | 4 |
|---|---|---|---|---|
| POPING CONCENTRATION OF $Nd_2O_3$ (wt %) | 8 | 8 | 4 | 6 |
| TOTAL THICKNESS OF DOPED LAYERS 2td (mm) | 0.8 | 3.8 | 5 | 3.2 |
| TOTAL THICKNES OF LASER MEDIUM T (mm) | 8 | 10 | 16 | 16 |
| TOTAL WIDTH OF LASER MEDIUM W (mm) | 20 | 20 | 60 | 60 |
| TOTAL LENGTH OF LASER MEDIUM L (mm) | 84 | 154 | 235 | 235 |
| 2td/T | 0.10 | 0.38 | 0.31 | 0.20 |
| STORAGE EFFICIENCY (%) | 2.5 | 3.2 | 3.1 | 3.0 |
| SINGLE PATH GAIN (go$l$) | 0.96 | 1.55 | 1.10 | 0.99 |

COMPOSITE SLAB LASER MEDIUM AND A LASER EMPLOYING THE COMPOSITE SLAB LASER MEDIUM

BACKGROUND OF THE INVENTION

1. Field of the Invention

This invention relates to a composite slab laser medium in which a doped layer is formed by laser glass containing $Nd_2O_3$ as a laser active material and also relates to a laser device using this composite slab laser medium.

2. Description of The Related Art

In recent years, in some fields of the application of a laser (for example, in the study of an X-ray laser and of nonlinear effects), there has been a necessity for what is called a high-peak-power laser which can be repeatedly operated and have high beam quality.

In such circumstances, a glass slab laser is currently under research and development. A slab has a larger surface area for cooling than a rod has. Moreover, a slab has one-dimensional temperature and gain distributions, so that the temperature and gain distributions can be compensated by employing a zig-zag geometry as a laser geometry. Thus a slab has a technical advantage that it can realize a laser having high beam quality, the operations of which are able to be very frequently repeated.

Such a glass slab laser, however, has its limits of performance owing to the facts that the width of a slab is finite and that there is a difference between real and ideal uniformities of pumping and cooling properties thereof. In principle, it is enough for improving the performance thereof to thin and widen a slab to be employed therein. However, as the result of the thinning and widening, the mechanical strength and the precision of abrasion of surfaces of the slab are degraded. Consequently, the beam quality is lowered as well as laser oscillation becomes unstable.

To solve this problem of the glass slab laser, a composite slab has been proposed by J. L. Emmett et al. of the Lawrence Livermore National Laboratory (see J. L. Emmett, W. K. Krupke, W.R. Sooy, "The Potential of High Average Power Laser", Lawrence Livermore National Laboratory, Livermore, Calif., UCRL-53571).

The proposed composite slab is formed by bonding laser glass plates (hereunder sometimes referred to as doped layers), each of which contains active ions, to both sides of a non-doped glass plate (hereinafter sometimes referred to as non-doped layers) containing no laser active ions, respectively. The non-doped layer ensures a total thickness larger than a predetermined value for the composite slab, while the doped layers is made to be thin for the purpose of realizing a composite slab equivalent to a thin monolithic slab (namely, a composite slab having the same characteristics as a thin monolithic slab has).

Inventors of the present invention have manufactured a composite slab having a layered structure by way of trial, based on the proposition described above, by performing a welding method and further has checked the performance of the thus manufactured composite slab. As the result, it has turned out that if the thickness of the doped layer is decreased on condition that the total thickness of the composite slab is kept constant, thermal birefringence effects and thermal lens effects can be mitigated even in case where the same quantity of energy is stored and that the beam quality at the time of effecting iterative operations is increased in comparison with a monolithic slab laser. Thus it has been considered that a composite slab is utilized for repeatedly operating a glass slab laser which has a high-peak-power and can decrease a beam spread.

However, it has also turned out that the composite slab has defects in that as the doped layer becomes thinner, storage efficiency (namely, efficiency in storing energy) becomes lower, similarly as a monolithic glass laser has. Further, it has been also found that if the difference between the refractive indices of the doped-layer and of the non-doped layer is equal to or larger than $1 \times 10^{-5}$ or so, a transverse mode pattern splits into three layers. This is confirmed by checking a burn pattern (i.e., a transverse mode pattern) in case of a normal oscillation. Namely, the burn pattern which is a rectangular image obtained by exposing a laser beam onto a film has three layers (i.e., a bright, dark and bright layers). This results from the facts that the doped layer is different in refractive index from the non-doped layer and that a distribution of the intensity of light on the transverse mode pattern (i.e., a cross section of the laser beam) is due to a phase difference caused by the difference in refractive index between the doped and the non-doped layers. Namely, the three layers of the transverse mode pattern originate from a difference in optical length (corresponding to the phase difference) between a laser beam incident on (or emitted from) the doped layer and another laser beam incident on (or emitted from) the non-doped layer.

Thus, it is considered that only laser beams incident on or emitted from the non-doped layer are utilized for improving a phase characteristic and raising the beam quality of the glass slab laser. This, however, results in that all of the cross section of a composite slab cannot be utilized. Consequently, this gives rise to the following drawbacks.

First, the proportion of a region, which no laser beams can pass through, of the doped layer to the whole thereof increases, with the result that the efficiency in extracting energy, which is stored in the doped layer, therefrom decreases.

Second, power extractable from the whole composite slab is limited to a low level because a fluence (i.e., energy per unit area) depends on laser damage when drawing high-peak-power therefrom.

Third, the aspect ratio of a laser beam increases to an extent undesirable for handling the laser.

Thus, it has turned out that the composite slab has not only the advantages as known when proposed by Dr. Emmett et al. (namely, the beam quality as well as a thermal-dissipation-limit average power output can be improved) but the defects as described above. Incidentally, it is still an unresolved problem how to provide a composite slab with an optimal structure for a purpose in using a glass slab laser by taking such advantages and defects into consideration.

The present invention is created to eliminate the above described drawbacks of the conventional glass slab laser.

It is, therefore, an object of the present invention to provide a composite slab laser medium which can achieve a highly efficient repetitive operation by using optimal values of a quantity of laser active ions contained in each doped layer and of a thickness of each doped layer and a ratio of the thickness of each doped layer to a thickness of the whole composite slab and can obtain laser beam provided with a high beam quality and high-peak-power by performing the repetitive oscillation.

It is another object of the present invention to provide a laser which is provided with such a laser medium.

SUMMARY OF THE INVENTION

To achieve the foregoing object, in accordance with a first aspect of the present invention, there is provided a composite slab laser medium which comprises a non-doped layer containing substantially no laser active materials and a first and second doped layers provided at both sides of the non-doped layer, respectively, in such a manner to hold the non-doped layer, each of which contains a laser active material. In this composite slab laser, a first surface of the first doped layer and a second surface of the second doped layer are in contact with the outside of the composite slab laser medium and are parallel with each other. Further, a laser oscillation or an optical amplification is performed by extracting a laser beam which travels in a zig-zag path undergoing total internal reflection at the first and second surfaces employed as alternate reflecting surfaces within the composite slab laser medium.

Moreover, layers made of laser glass containing $Nd_2O_3$ of from 3 to 9% by weight (wt %) is employed as the doped layers.

Furthermore, a total of the thicknesses of the first and second doped layers is of from 0.6 to 8.0 millimeters (mm).

Additionally, the ratio of the total of the thicknesses of the first and second doped layers to the thickness of the whole composite slab laser medium is of from 0.075 to 0.40.

Thereby, a composite slab laser medium, the gain of which is well balanced with the cross section of a laser beam, can be realized.

In accordance with a second aspect of the present invention, there is provided a laser which comprises a laser medium and a pump source for optical pumping of the laser medium. Further, as this laser medium, the composite slab laser medium according to the first aspect of the present invention is employed.

Thereby, a laser capable of emitting a laser beam with a high-beam-quality and high-peak-power can be realized.

Hereinafter, an operation of the composite slab laser medium will be described in detail by referring to FIGS. 2 and 3.

First, regarding doping concentration of $Nd_2O_3$, it is not sufficient for increasing the gain to simply increase the doping concentration of $Nd_2O_3$ and efficiency in absorbing pump light. This is because it is also necessary for that purpose to lengthen a fluorescence lifetime. Hence, it is conjectured that there is an optimal value of the doping concentration of $Nd_2O_3$. However, in case of a composite slab laser medium having a characteristic structure that a non-doped layer intervening between doped layers which can be thin, the optimal value of the doping concentration of $Nd_2O_3$ cannot be easily estimated differently from a case of a monolithic laser medium where the optimal value of the doping concentration has been estimated theoretically. Thus the gain of the composite slab is investigated by taking the fluorescence lifetime in consideration.

FIG. 2 is a graph showing the result of the investigation. Namely, FIG. 2 illustrates the relation between a small-signal gain and the thickness of the doped layer by employing the doping concentration of $Nd_2O_3$ as a parameter. Incidentally, the y-axis of the graph represents the relative small signal gain (g0l); and the x-axis thereof the thickness of the doped layer (in mm).

As shown in this graph, it turns out that the optimal doping concentration is $6\pm3$ wt %. When the doping concentration of $Nd_2O_3$ is less than 3 wt %, the efficiency in absorbing pump light becomes low. Further, when the doping concentration of $Nd_2O_3$ is greater than 9 wt %, the fluorescence lifetime becomes too short. Thus, it is construed that when the doping concentration of $Nd_2O_3$ is less than 3 or greater than 9 wt %, the gain becomes low.

Next, regarding the thickness of the doped layer, as it is seen from Fig. 2, the small-signal gain coefficient changes according to an exponential function of the thickness of the doped layer. Further, in case where only the laser beam incident on (or emitted from) the non-doped layer is used for improving the beam quality of the composite slab, the three drawbacks described above is brought about. Therefore, it is advantageous for eliminating the drawbacks to increase the ratio of the cross section of the non-doped layer to the total cross section of the composite slab laser medium. This results in that the ratio of the total thickness of the doped layers to the thickness of the non-doped layer decreases and the gain is lowered. The present invention is accomplished to provide a structure of the composite slab which can realize an optimal relation between the thickness of the non-dope layer and the total thickness of the doped layers.

The ratio (hereunder referred to simply as the cross-section ratio) of the cross section of the non-doped layer to the total cross section of the composite slab is obtained by calculating $[1 - 2t_d / T]$ where $t_d$ denotes the thickness of each of the doped layers and T designates the thickness of the composite slab. Further, a product $F(t_d)$ of the cross-section ratio $[1 - 2t_d / T]$ and the gain g0l of FIG. 2 is calculated for each of the doped layers. Consequently, it is found that there is an optimal thickness of the doped layer, as illustrated in FIG. 3. Namely, FIG. 3 shows how the product $F(t_d)$ varies with the thickness $t_d$ of each of the doped layer, by employing the total thickness T of the composite slab. In FIG. 3, the y-axis represents the product $F(t_d) = g0l\ [1 - 2t_d / T]$ (in arbitrary units) and the gain g0l, and the x-axis designates the thickness $t_d$ of each of the doped layers (in mm).

Here, note that if the total thickness T of the composite slab is equal to or less than 5 mm, the mechanical strength of the glass cannot is low and thus a composite slab made of such glass is of no use. In contrast, if the total thickness T of the composite slab is increased, the optical path in the doped layer becomes shorter and thus the gain becomes low. Generally, in light of the balance of the mechanical strength and the gain of the composite slab, the proper value of the total thickness T is considered to be equal to or less than 24 mm. Further, in case that the total thickness T is equal to or less than 24 mm, the optimal total thickness $2t_d$ of the doped layers is within the range of from 0.6 to 8 mm, as is seen from FIG. 3. This is because of the fact that the total thickness $2t_d$ of the doped layers having values other than the values of from 0.6 to 8 mm causes results contrary to the objects of the present invention. Namely, the gain drastically decreases when the total thickness $2t_d$ of the doped layers is equal to or less than 0.6 mm.

In contrast, the ratio of the cross section of the non-doped layer to the total cross section of the composite slab becomes small and the efficiency in extracting the energy stored in the doped layer is deteriorated when the total thickness $2t_d$ of the doped layers is equal to or more than 8 mm.

In addition, regarding the ratio of the thickness $t_d$ of each of the doped layers, the optimal ratio of the thickness $t_d$ to the total thickness T is considered to be within the range of from 0.076 to 0.4 for the same reason.

In this way, the optimal relation between the thickness of the non-dope layer and the total thickness of the doped layers is established. Thereby, a composite slab laser medium, which can achieve a highly efficient repetitive operation and can obtain laser beams with a high beam quality and high-peak-power by performing the repetitive oscillation, can be provided. Moreover, a laser which is provided with such a laser medium can be obtained.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 5 is a diagram for illustrating the result of an experiment relating to a laser oscillation made by using the laser of FIG. 4.

DETAILED DESCRIPTION OF THE PREFERRED EMBODIMENTS

Hereinafter, preferred embodiments of the present invention will be described in detail by referring to the accompanying drawings.

Figure 1:
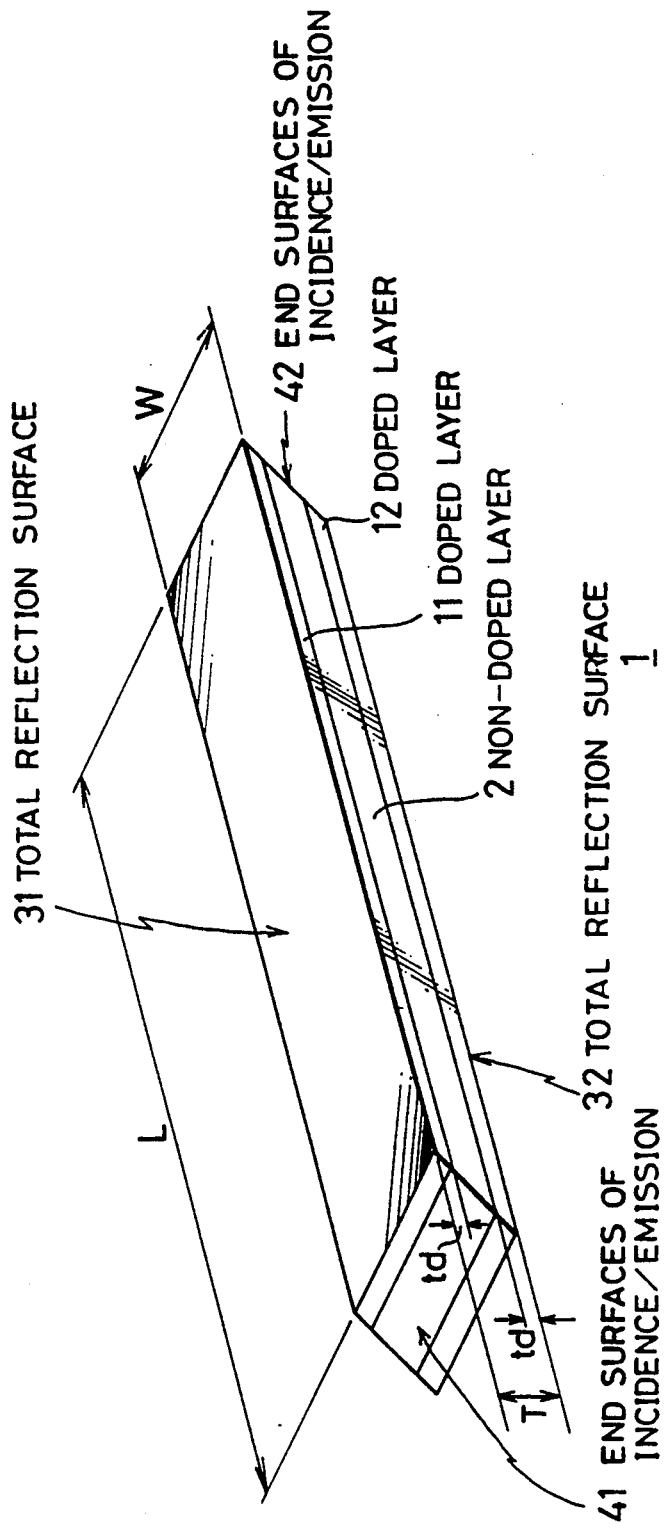
FIG. 1 is a perspective view of a composite slab laser medium embodying the present invention.
Figure 2:
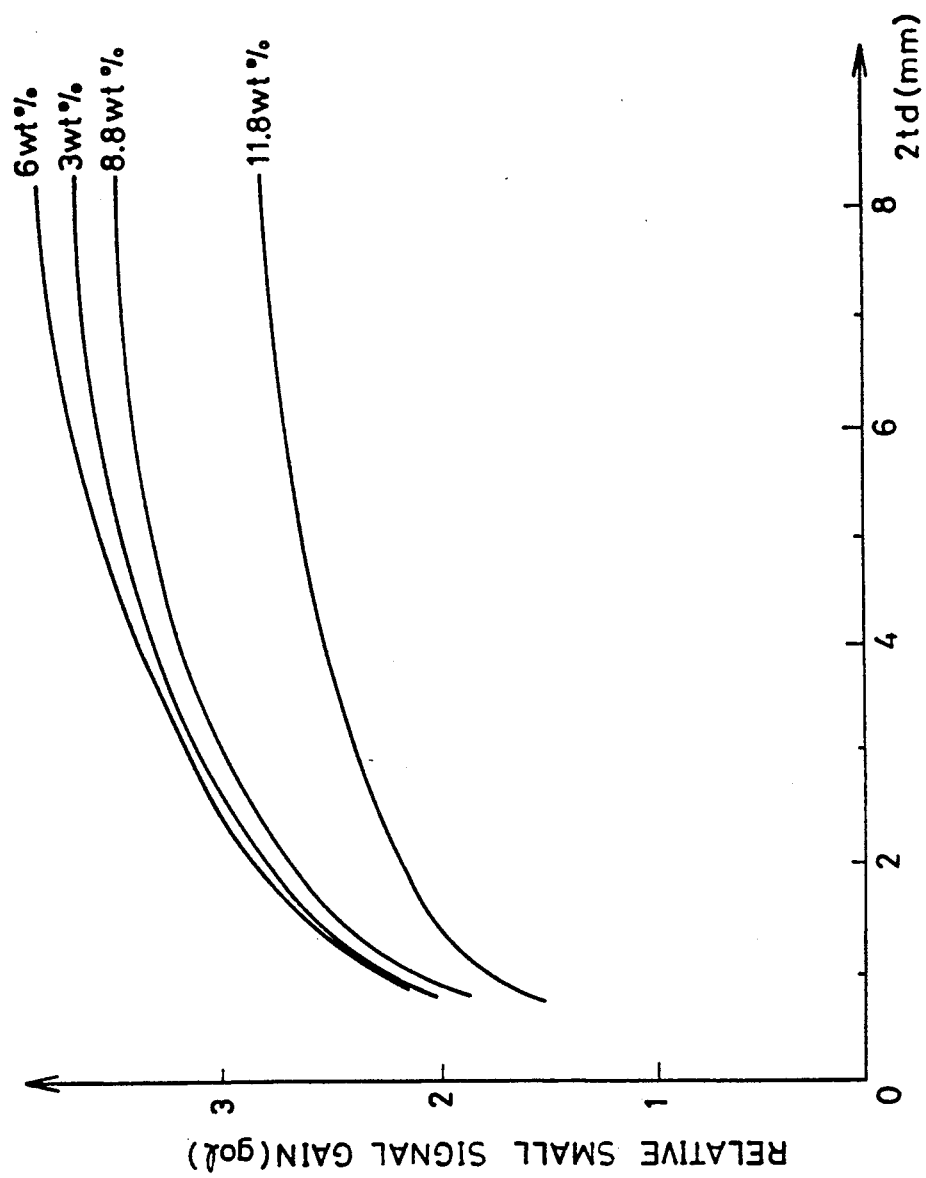
FIG. 2 is a graph showing the relation between the gain and the thickness of each of the doped layers.
Figure 3:
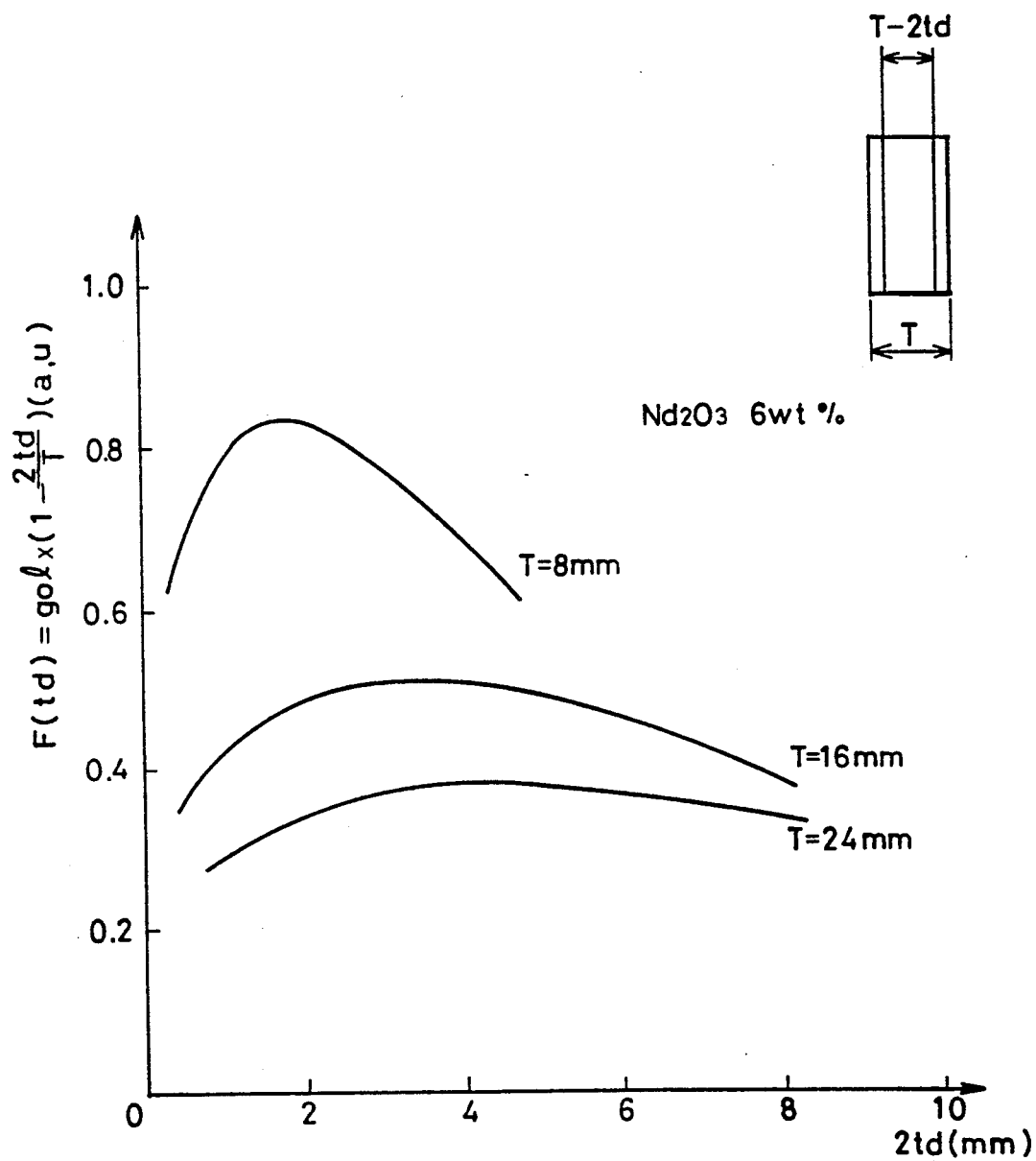
FIG. 3 is a graph showing the product $F(t_d)$ and the thickness of each of the doped layers.

FIG. 1 is a perspective view of a composite slab laser medium embodying the present invention. Further, FIG. 4 is a partial perspective view of a laser employing the composite slab laser medium of FIG. 1.

Figure 4:
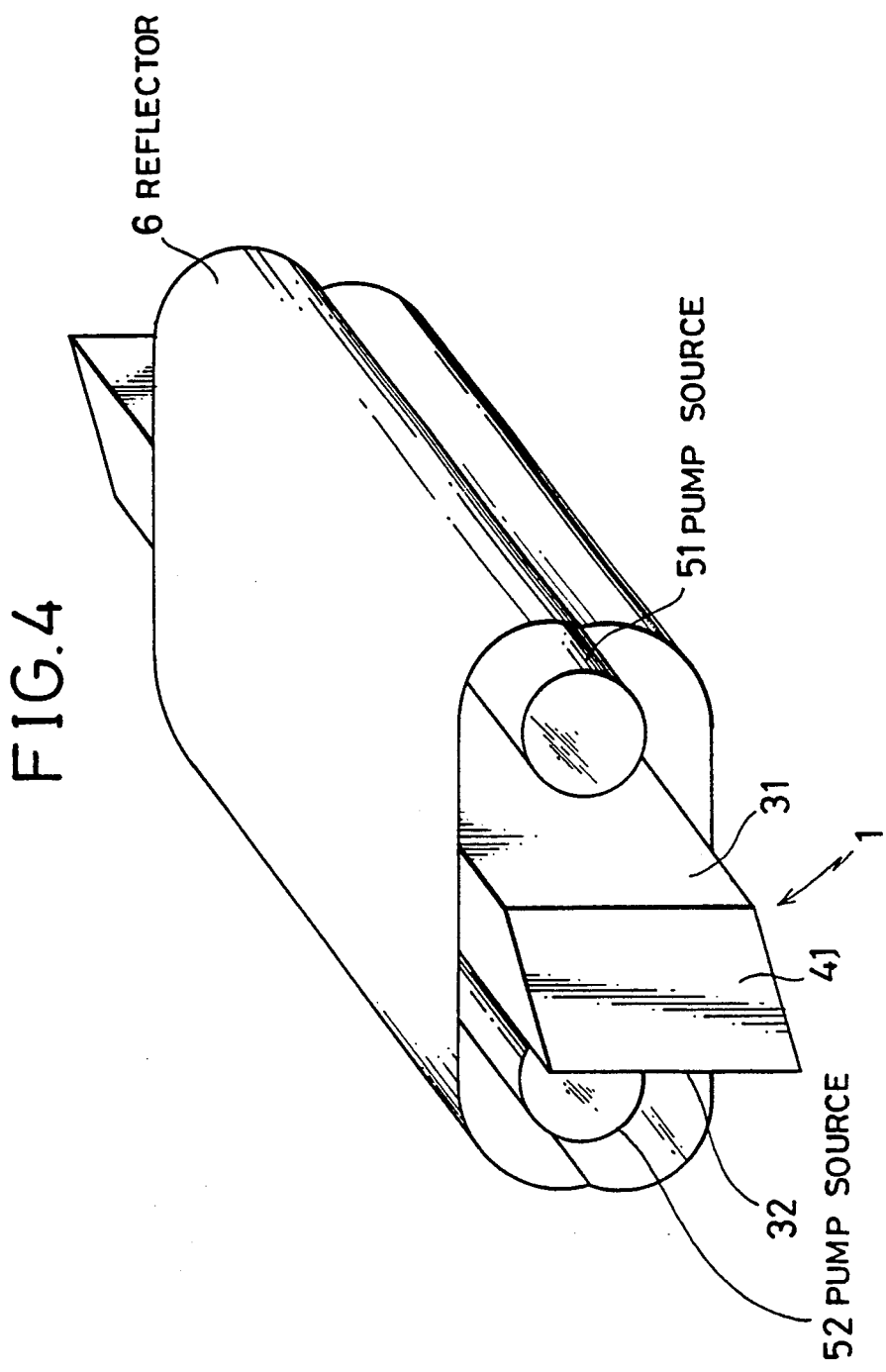
FIG. 4 is a partial perspective view of a laser employing the composite slab laser medium of FIG. 1.

In FIGS. 1 and 4, reference numeral 1 a composite slab laser medium; 11 and 12 doped layers; 2 a non-doped layer; 31 and 32 total reflector surfaces (cooling surfaces); 41 and 42 end surfaces of incidence/emission; 51 and 52 pump sources; and 6 a reflector.

In this composite slab laser medium 1, the doped layers 11 and 12 are respectively formed at both sides of the non-doped layer 2 in such a manner to hold the layer 2 by welding two glass plates containing a laser active material ($Nd_2O_3$) to the top and bottom surfaces of another glass plate containing no laser active material, respectively, as viewed in FIG. 1. Incidentally, each of the glass plates is manufactured in such a fashion to have a predetermined form and size. Further, the surfaces of each of the glass plates are preliminarily polished and washed. Then, the outer surfaces of the doped layers 11 and 12 are precisely polished in such a way to be parallel with each other and to serve as the total reflection surfaces 31 and 32. Moreover, the end surfaces 41 and 42 of incidence/emission are formed by processing both end surfaces in the longitudinal direction of the composite slab in such a manner to be parallel with each other and to be oriented a predetermined angle (namely, 33.3 degrees in this embodiment) away from the total reflection surfaces 31 and 32 so that a laser beam is incident on the surface 41 or 42 at Brewster's angle. A laser beam incident on the surface 41 of incidence/emission follows a zig-zag path undergoing total internal reflection at the total reflection surfaces 31 and 32 and is emitted from the other surface 42 of incidence/emission.

Further, in the laser of FIG. 4, the pump sources (xenon flash lamps in this embodiment) 51 and 52 are arranged in such a fashion to face the total reflection surface 31 and 32 of the composite slab laser medium 1, respectively. Pump light emitted from the pump sources 51 and 52 are concentrated by surrounding these composing elements with the reflector 6 in order to pump the composite slab laser medium 1. Therefore, if a laser beam to be amplified is incident on one of the surfaces 41 and 42 of incidence/emission, the laser beam is amplified until emitted from the other of the surfaces 41 and 42 of incidence/emission.

Incidentally, in case where a laser oscillator is fabricated, a mirror for laser resonance is provided in the vicinity of each of the surfaces 41 and 42 of incidence/emission of the composite slab laser medium shown in FIG. 4.

Thus the composite slab laser medium 1 embodying the present invention can be employed in both cases that a laser is used as an optical amplifier (or laser amplifier) and that a laser is used as a laser oscillator.

Turning to FIG. 5, there is listed a table for illustrating the result of an experiment relating to a laser oscillation, which is carried out on the composite slab laser medium 1 by using the laser of FIG. 4. This experiment is conducted on the composite slab laser medium 1 by changing the following parameters variously:

(a) the doping concentration of $Nd_2O_3$ to be contained in the doped layers 11 and 12;

(b) the total thickness $2t_d$ of the doped layers 11 and 12;

(c) the total thickness T of the composite slab laser medium;

(d) the total width W of the composite slab laser medium; and (e) the total length L of the composite slab laser medium.

Additionally, in this case, phosphate laser glass LHG-5 ("LHG-5" is a trademark for a kind of laser glass manufactured by HOYA CORPORATION) is employed as the laser glass which is a material of the doped layers 11 and 12.

Furthermore, non-doped glass, which has a refractive index is different from the refractive index of the phosphate laser glass LHG-5 by $13 \times 10^{-5}$ and a coefficient of thermal expansion is different from the coefficient of thermal expansion of the laser glass LHG-5 by $1 \times 10^{-7}/°$ C., is employed as a material of the non-doped layer 2.

Moreover, two xenon flash lamps (see FIG. 4, 1 K Joule (J) / pulse, 900 μs) are used as the pump sources 51 and 52 in Cases 1 and 2 of FIG. 5. Furthermore, four xenon flash lamps (2 K Joule (J) / pulse, 900 μs) are used as the sources 51 and 52 in Cases 3 and 4.

In either case, xenon flash lamps can supply a laser beam having good characteristics, for instance, a period of 1 pps and a beam spread of 1 m rad.

While preferred embodiments of the present invention have been described above, it is to be understood that the present invention is not limited thereto and that other modifications will be apparent to those skilled in the art without departing from the spirit of the invention.

The scope of the present invention, therefore, is to be determined solely by the appended claims.

What is claimed is:

1. A composite slab laser medium for amplifying a laser beam comprising:
   a non-doped layer containing substantially no laser active materials; and
   a first and second doped layers, each of which contains a laser active material, a first surface of said first doped layer and a second surface of said second doped layer being in contact with outside surfaces of said composite slab laser medium, said first and second surfaces being parallel with each other, and a laser beam travelling in a zig-zag path to undergo a total internal reflection at the first and second surfaces which are employed as alternate reflecting surfaces within said composite slab laser medium,
   wherein said first and second doped layers are made of a laser glass containing 3 to 9% by weight of said active material and have a total thickness from 0.6 to 0.8 mm, and a ratio of the total thickness of said first and second doped layers to a thickness of the composite slab laser medium is from 0.075 to 0.40.

2. A composite slab laser medium according to claim 1, wherein said active material is $Nd_2O_3$.

3. A composite slab laser medium for at least one of optical oscillation and optical amplification of a laser beam comprising:
   a non-doped layer having a first surface and a second surface; and
   first and second doped layers containing an active material, each layer having an inner surface and outer surface, said inner surface of said first doped layer being disposed on said first surface, and said inner surface of said second doped layer being disposed on said second surface, said first and second doped layers containing a predetermined concentration of said active material for total internal reflection of the laser beam traveling in a zig-zag path through said composite slab laser medium at said outer surfaces of said first and second doped layers, wherein said first and second doped layers are made of a laser glass containing 3 to 9% by weight of said active material.

4. A composite slab laser medium according to claim 3 wherein said non-doped layer contains substantially no active material.

5. A composite slab laser medium according to claim 4 wherein said outer surfaces of said first and second doped layers are parallel to each other.

6. A composite slab laser medium according to claim 5 wherein said active material is $Nd_2O_3$.

7. A composite slab laser medium according to claim 6 wherein said first and second layers have a total thickness of from 0.6 to 8.0 mm.

8. A composite slab laser medium according to claim 7 wherein a ratio of said total thickness of said first and second doped layers to a thickness of said composite slab laser medium is from 0.075 to 0.40.

9. A composite slab laser medium according to claim 3 wherein said predetermined concentration is from 3 to 9% by weight of said active material.

10. A composite slab laser medium according to claim 9 wherein said active material is $Nd_2O_3$.

11. A composite slab laser medium according to claim 3 wherein said first and second layers have a total thickness of from 0.6 to 8.0 mm.

12. A composite slab laser medium according to claim 3 wherein a ratio of said total thickness of said first and second doped layers to a thickness of said composite slab laser medium is from 0.075 to 0.40.

13. A composite slab laser medium according to claim 3 wherein said composite slab laser medium has a thickness substantially equal to or less than 24 mm.

14. A composite slab laser comprising:
   a non-doped layer having a first surface and a second surface;
   first and second doped layers containing an active material, each layer having an inner surface and an outer surface, said inner surface of said first doped layer being disposed on said first surface and said inner surface of said second doped layer being disposed on said second surface to form a composite slab laser medium; and
   first and second pump sources provided on said outer surface of said first and second doped layers, respectively, for optical pumping of said composite slab laser medium with optical beams, said first and second doped layers containing a predetermined concentration of said active material for total internal reflection of the optical beams traveling in a zig-zag path through said composite slab laser medium at said outer surfaces of said first and second doped layers, wherein said first and second doped layers are made of a laser glass containing 3 to 9% by weight of said active material.

15. The composite slab laser as set forth in claim 14, which further comprises a reflector surrounding said composite slab laser medium for concentration the optical beams emitted from said first and second pump sources onto said composite slab laser medium.

16. A composite slab laser according to claim 14 wherein said active material $Nd_2O_3$.

17. A composite slab laser according to claim 14 wherein said first and second layers have a total thickness of from 0.6 to 0.8 mm.

18. A composite slab laser according to claim 14 wherein a ratio of said total thickness of said first and second doped layers to a thickness of said composite slab laser medium is from 0.075 to 0.40.

19. A composite slab laser medium for at least one of optical oscillation and optical amplification of a laser beam comprising:
   a non-doped layer having a first surface and a second surface; and
   first and second doped layers containing an active material, each layer having an inner surface and outer surface, said inner surface of said first doped layer being disposed on said first surface, and said inner surface of said second doped layer being disposed on said second surface, said first and second doped layers containing a predetermined concentration of said active material for total internal reflection of the laser beam traveling in a zig-zag path through said composite slab laser medium at said outer surfaces of said first and second doped layers, wherein said first and second doped layers have a total thickness from 0.6 to 0.8 mm, and a ratio of the total thickness of said first and second doped layers to a thickness of the composite slab laser medium is from 0.075 to 0.40.

20. The composite slab laser medium according to claim 19, wherein said first and second doped layers are made of a laser glass containing 3 to 9% by weight of said active material.

21. The composite slab laser medium according to claim 19, wherein said active material is $Nd_2O_3$.

22. A composite slab laser comprising:
a non-doped layer having a first surface and a second surface;
first and second doped layers containing an active material, each layer having an inner surface and an outer surface, said inner surface of said first doped layer being disposed on said first surface and said inner surface of said second doped layer being disposed on said second surface to form a composite slab laser medium, wherein said first and second doped layers have a total thickness from 0.6 to 8.0 mm, and a ratio of the total thickness of said first and second doped layers to a thickness of the composite slab laser medium is from 0.075 to 0.40; and
first and second pump sources provided on said outer surfaces of said first and second doped layers, respectively, for optical pumping of said composite slab laser medium with optical beams, said first and second doped layers containing a predetermined concentration of said active material for total internal reflection of the optical beams traveling in a zig-zag path through said composite slab laser medium at said outer surfaces of said first and second doped layers.

23. The composite slab laser according to claim 22, wherein said first and second doped layers are made of laser glass containing 3 to 9% by weight of said active material.

24. The composite slab laser according to claim 22, wherein said active material is $Nd_2O_3$.

* * * * *